Figure 7:
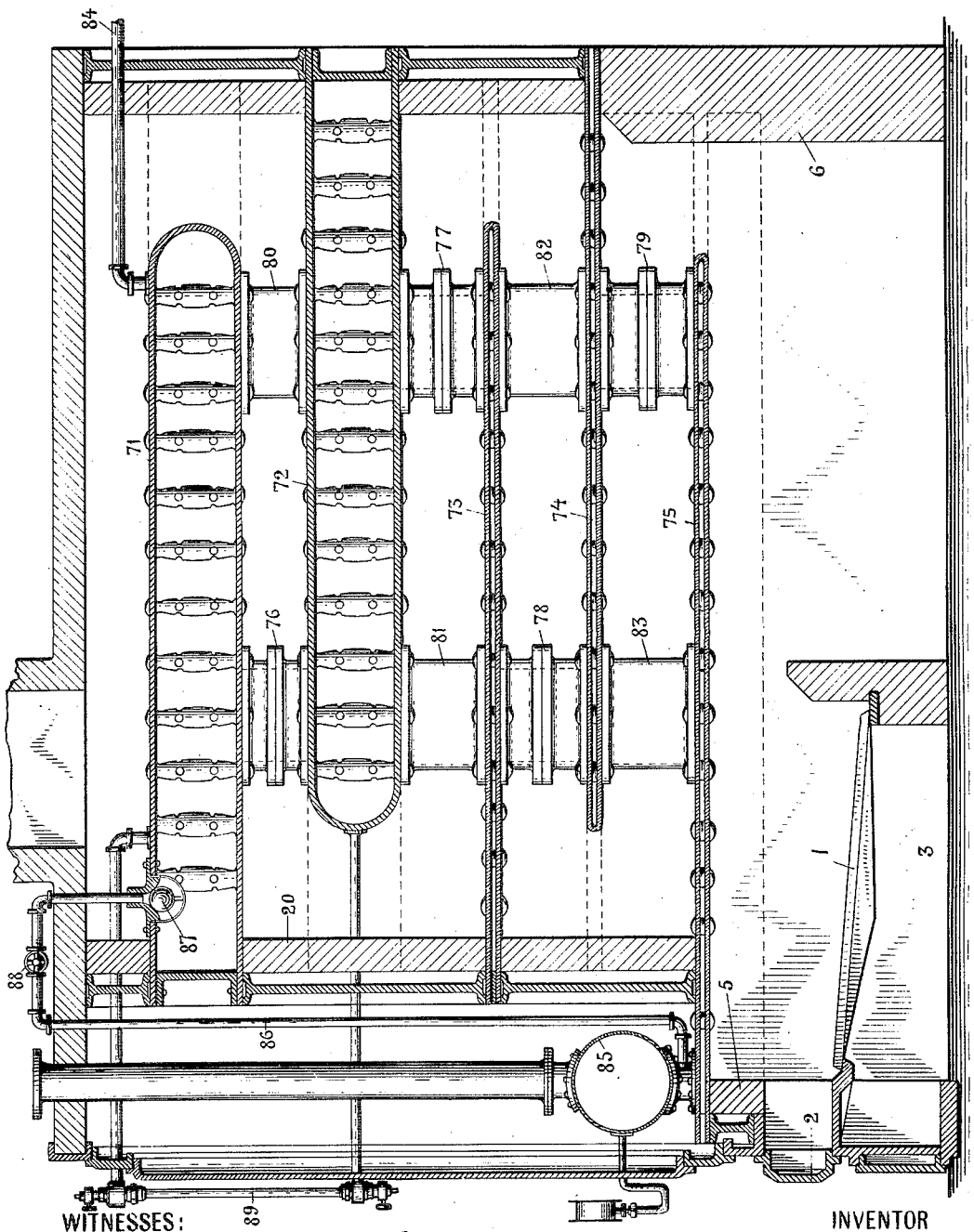

A. A. E. STERZING.
STEAM GENERATOR.
APPLICATION FILED APR. 24, 1902. RENEWED APR. 30, 1912.
1,049,546.
Patented Jan. 7, 1913.
4 SHEETS—SHEET 1.
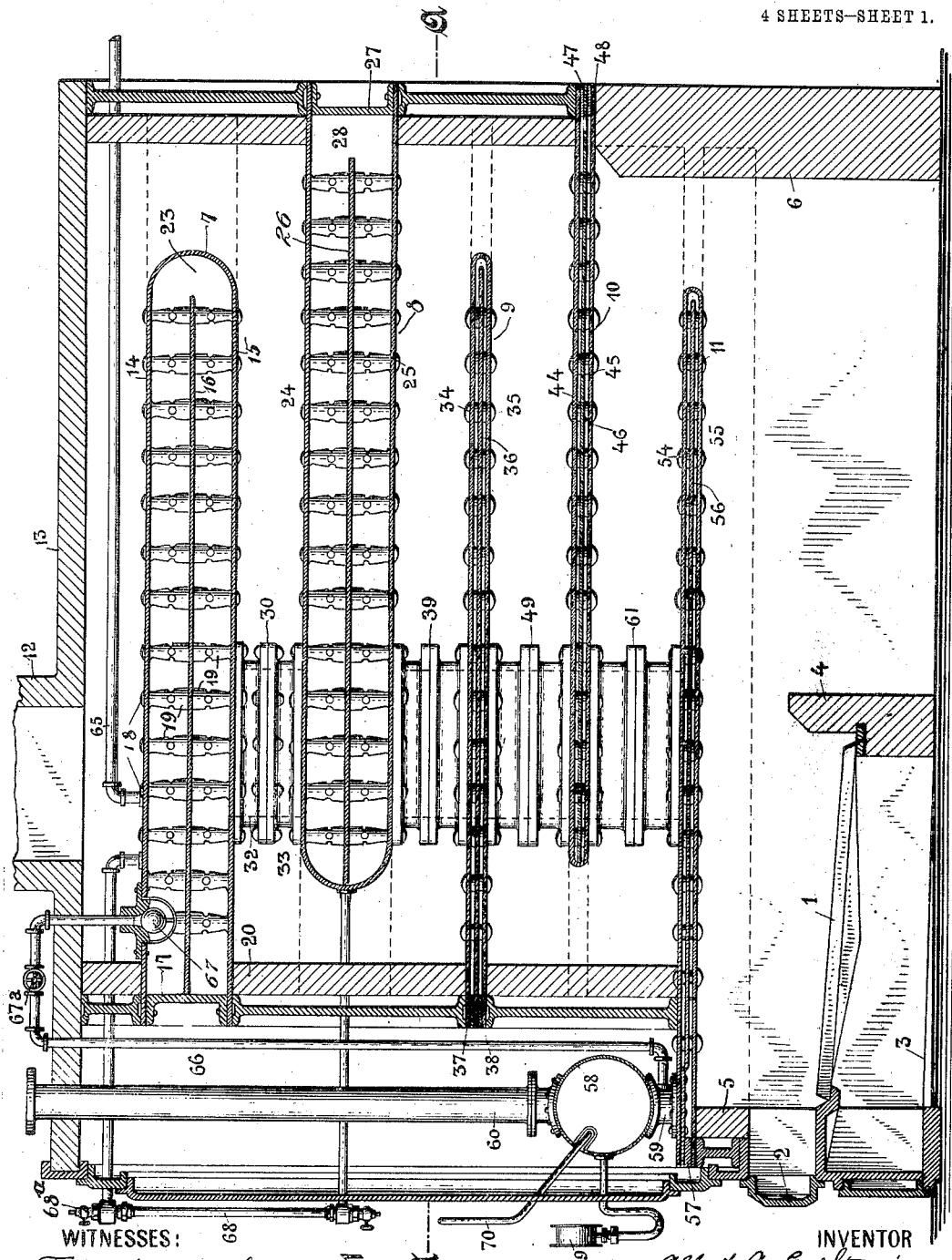
WITNESSES:
F. N. Roehrich
Sidney Mann
INVENTOR
Albert A. E. Sterzing
BY
J. H. Freeman
ATTORNEY

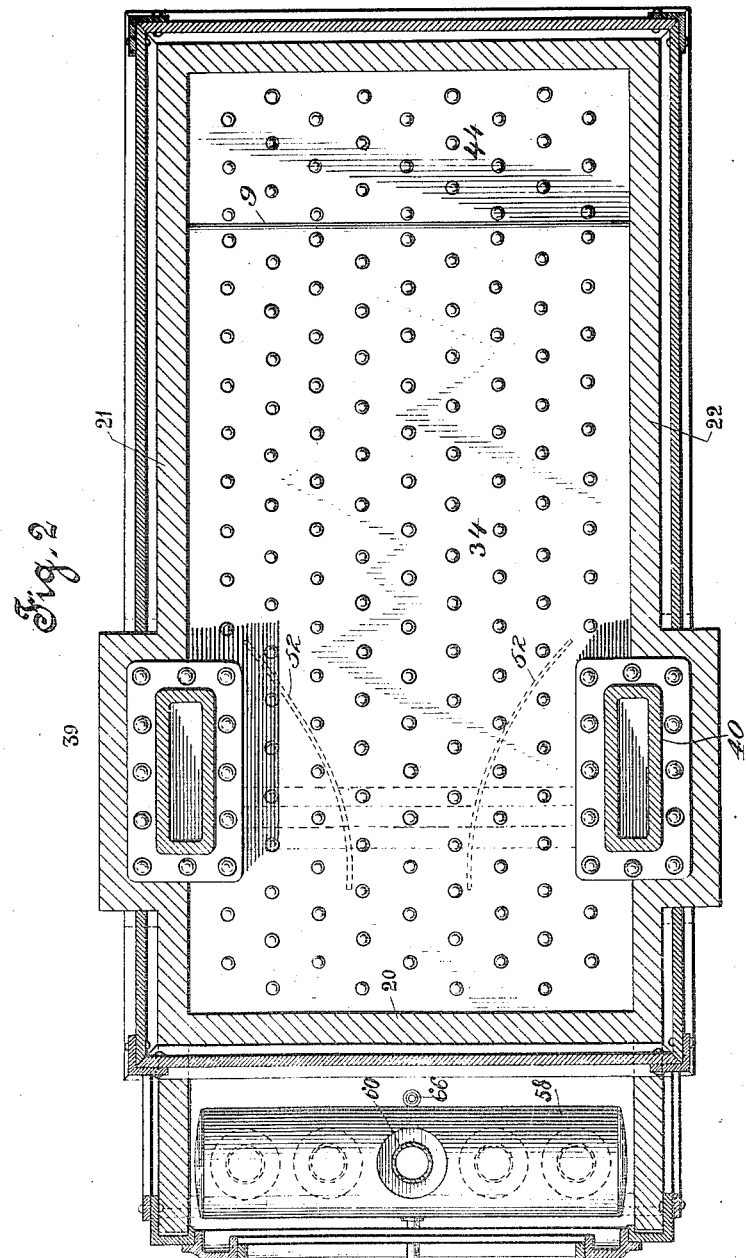

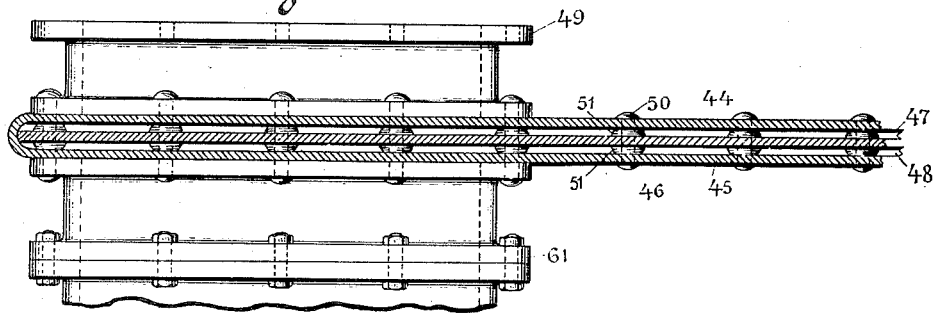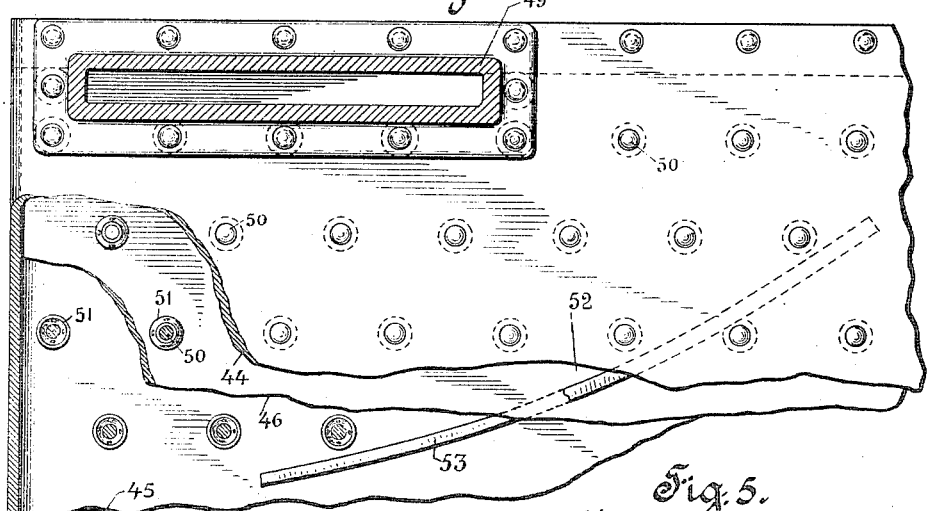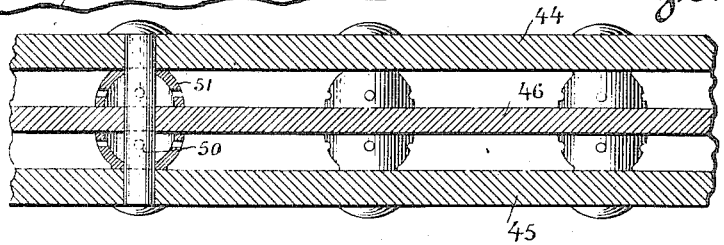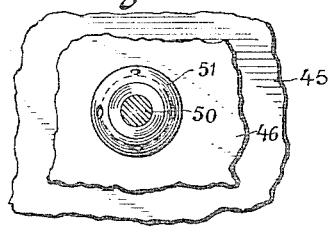

A. A. E. STERZING.
STEAM GENERATOR.
APPLICATION FILED APR. 24, 1902. RENEWED APR. 30, 1912.

1,049,546.

Patented Jan. 7, 1913.

4 SHEETS—SHEET 4.

WITNESSES:
F. N. Roehrich
Sidney Mann.

INVENTOR
Albert A. E. Sterzing
BY J. H. Freeman
ATTORNEY

UNITED STATES PATENT OFFICE.

ALBERT A. E. STERZING, OF NEW YORK, N. Y.

STEAM-GENERATOR.

1,049,546. Specification of Letters Patent. Patented Jan. 7, 1913.

Application filed April 24, 1902, Serial No. 104,449. Renewed April 30, 1912. Serial No. 694,302.

*To all whom it may concern:*

Be it known that I, ALBERT A. E. STERZING, a subject of the King of Great Britain, and a resident of the city, county, and State of New York, have invented certain new and useful Improvements in Steam-Generators, of which the following is a specification.

My invention relates to an apparatus for generating steam and more particularly to an apparatus for maintaining a supply of superheated steam at a high temperature and pressure.

My invention has for an object to provide an apparatus in which the fluid in the generator and the products of combustion from the combustion chamber flow in opposite directions so that the water or other liquid is gradually heated from the point where it enters the generator to the point where it is all transformed into superheated steam and that the heat is gradually and uniformly and efficiently absorbed from the products of combustion.

It is also an object of the invention to maintain the flow of the fluid in that part of the generator where the vaporization takes place at the maximum speed, and also to maintain the flow of the products of combustion at the maximum speed while in contact with the generator; also to provide an apparatus in which there are no sudden fluctuations in the temperature of the metal and in which there is perfect flexibility and freedom of independent expansion of each part; also to provide an apparatus which is simple and cheap in construction and which is arranged to permit ready access to every part; also to provide an apparatus which is safe and reliable in operation and which is durable and not apt to get out of order.

These and other objects of my invention will more fully appear from the following description.

My invention consists in the novel parts, improvements and combinations herein shown and described.

The accompanying drawings which are referred to herein and form a part hereof illustrate two embodiments of my invention and serve, in connection with the description herein, to explain the principles of the invention and the best mode contemplated by me of carrying those principles into effect.

Of the drawings Figure 1 is a vertical central section illustrating a preferred form of the apparatus; Fig. 2 is a sectional plan of the same taken on the line A A, Fig. 1; Figs. 3 and 4 are respectively a vertical and a transverse section on a larger scale illustrating certain details of construction; Figs. 5 and 6 are similar views on a still larger scale illustrating a detail; Fig. 7 is a view similar to that shown in Fig. 1, illustrating a modified form of the apparatus.

Like reference numerals refer to like parts wherever they occur throughout the several views.

An apparatus constructed in accordance with my invention consists in the combination with a combustion chamber, of a plurality of steam generating elements each consisting of parallel plates secured together at their edges to form a steam generating space having a large area of heating surface in proportion to its volume, said elements being separated from each other to form a sinuous passage for the products of combustion and connected together in series by means forming communicating passages between the spaces in said elements. Means are also provided for supplying water or other liquid to the element farthest from the combustion chamber and for delivering the steam from the element nearest the combustion chamber.

Referring now to the drawings in detail and at first to the preferred form of the apparatus illustrated in Figs. 1 to 6 inclusive, 1 represents the grate bars, 2 the door, 3 the ash pit, and 4 the rear wall of an ordinary furnace. The generator as a whole is inclosed and supported by suitable walls the front and rear sections of which are respectively represented by numerals 5 and 6. In accordance with the construction shown the water heating and steam generating elements 7, 8, 9, 10 and 11 are arranged above the furnace, said elements being separated from and staggered with relation to each other to form a sinuous passage for the products of combustion which find their final exit in the uptake 12 formed in the top wall 13 of the apparatus. In accordance with the preferred construction, each of the water heating and steam generating elements consists of three parallel plates, the outer ones being secured together at their edges and separated from the intermediate plate to form a plurality of water heating and steam generating spaces having large areas of heating surface in proportion to their volume. The water heating elements 7 and 8 are preferably made much larger in volume than are the steam generating elements 9, 10 and 11, the object being to maintain a considerable supply of water heated nearly to the temperature of vaporization so as not to cause a considerable fluctuation in the temperature of the vaporizing portion of the generator due to sudden increases in the demand for steam. As shown the upper water heating element 7 consists of three plates, 14, 15 and 16, the outer plates 14 and 15 preferably being formed by bending a single sheet of metal back upon itself along its central portion, the bend thus forming an integral connection between the adjacent edges of the plates. The three remaining edges of the plates may be secured together in any suitable way, as by means of the flanged plate 17 which forms one end and two sides of the element. The intermediate plate 16 may be held in place in any suitable way. As a tight joint between the intermediate plate 16 and the flanged plate 17 does not need to be liquid tight, the intermediate plate is preferably held in place merely by means of the stay bolts 18 and distance pieces 19 which are arranged at suitable intervals throughout the intermediate portions of the element to take up the pressure on the outer plates and hold the parts in their proper relative positions. The three edges of the elements which are secured together by the flange plate 17 are preferably arranged in the end wall 20 and in the side walls 21 and 22, as shown in Figs. 1 and 2, so that only the plates 14 and 15 and the integral connection between one pair of their adjacent edges are exposed to the products of combustion. The intermediate plate 16 is made somewhat shorter than the element 7, and is supported with one of its ends and its two opposite sides in substantial contact with the end and side walls respectively of the flange plate 17, so as to form a communicating passage between the upper and lower spaces of the element 7 at one end thereof. The second water heating element 8 is preferably the same in construction as element 7, except that the intermediate plate 26 is arranged to make contact at one of its ends with the integral connection between one pair of the adjacent edges of the outside plates 24 and 25, a communicating passage 28 being formed between the opposite end of the intermediate plate 26 and the end portion of the flange plate 27. The element 8 is arranged in a reversed position and offset or staggered with reference to the element 7, the sides and end of the element 8 being arranged respectively in the side walls 21 and 22 and in the end wall 6 of the generator. The upper element 7 is connected at or near one end with the adjacent end of the element 8. Any suitable form of connection which will provide a communicating passage or passages of ample dimensions between the lower space of the upper element 7 and the upper space of the lower element 8 may be employed. These connections however should not be so constructed as to materially reduce the area of the passage formed between the elements for the products of combustion. Preferably and as shown the elements 7 and 8 are connected by a pair of elongated flange joints one of which is shown at 30, said joints being arranged at the opposite sides of the sections with their largest dimensions extending in the direction of the flow of the products of combustion. Each of these flange joints preferably consists of two sections 32 and 33 which are riveted to the plates 15 and 24 respectively and are adapted to be removably bolted together at their adjacent edges which are suitably flanged for this purpose, as shown.

The steam generating elements 9 and 10 correspond in all essential particulars with the water heating elements 7 and 8 respectively, except that the plates are separated from each other by spaces which are much less in volume than the spaces in the elements 7 and 8. The upper and lower plates 34 and 35 of the element 9 are formed by bending a single sheet of metal and they are preferably separated from the intermediate plate 36 by spaces which are about equal in depth to the thickness of the plates. The three plates are separated at their side edges and at one end by strips 37 and 38, the plates being secured together by rivets passing through the edges of the plates and the strips. The plate 36 is made somewhat shorter than 34 and 35 so as to form a communicating passage between the upper and lower spaces of the element, said passage being located at the end of the element which is formed by the integral connection between the plates 34 and 35. The opposite end of the element is located in the wall 20 and the opposite side edges of the element are located in the side walls 21 and 22 of the generator. The element 9 is connected at its opposite sides to the element 8 by flanged connections 39 and 40 (see Fig. 2) which are similar to and located in line with the connections between the elements 7 and 8. The element 10 consists of three plates 44, 45 and 46, which are combined in the same manner as the plates 34, 35 and 36, except that the plate 46 is made of substantially the same length as the plates 44 and 45 and is provided at a point adjacent to the strips 47 and 48 with a series of perforations which form communicating passages between the upper and lower spaces of the element. The elements 9 and 10 are connected at their opposite sides by flange pieces similar to the flange pieces 39 and 40 and arranged in line therewith. One of the flange pieces connecting elements 9 and 10 is numbered 49 in Fig. 1. The element 11 is composed of three plates 54, 55 and 56. This element differs in construction from element 9 only in that it is extended farther to the left and the intermediate plate 56 is bent upwardly so as to lie in contact with the upper plate 54 for a short distance near its left end. In accordance with this construction there is a single strip 57 arranged between the ends of the plates 55 and 56. The object of this construction is to provide a suitable space in which to collect the steam so that it can be uniformly delivered to a steam drum 58 which is connected to the element 11 by a series of flange joints 59. The steam is delivered from a drum 58 by a suitable pipe 60. The elements 10 and 11 are connected by flange joints similar to and arranged in line with the connections between the other elements. One of the connections between the elements 10 and 11 is numbered 61 in Fig. 1.

In Figs. 3 and 4 the details of the construction of the elements 9, 10 and 11 are shown on a larger scale, a portion of the left end of the element 10 being selected by way of example. As here shown, the plates 44, 45 and 46 are secured together at numerous points throughout the area of the element by stay bolts or rivets 50, the plates being separated by distance washers 51.

As shown in Figs. 5 and 6 the washers 51 are preferably flared so as to form spaces between them and the rivets 50 and the washers are perforated so as to permit free circulation of water around the rivets. In this way the heating surfaces of the steam generating spaces are very materially increased. The heat being conducted by the bolts to the interior of the element and then delivered directly to the water with which they come in contact. In order to get a more uniform circulation of the water through the element and especially through the end thereof adjacent to the connections 49 and 61, suitable partition pieces 52 and 53 are arranged in the upper and lower spaces of the element so as to cause a portion of the water to flow toward the middle of the end portion of the element. Similar pieces are arranged in the upper and lower spaces of the element 9 and in the upper space of the element 11, as indicated in Fig. 2. It will be seen that the lowest element 11 forms the top of the furnace. The elements 7 and 9 are extended to the left of the elements 8 and 10 and the latter elements are extended to the right of the elements 7, 9 and 11, so as to form a sinuous path for the escape of the products of combustion. The connections 30, 39, 49 and 61 are preferably made successively shorter from the bottom upwardly so as to make the passage for the products of combustion gradually decrease in size to correspond with the decrease in the volume of the products of combustion during their passage through the generator. The speed of flow of the products of combustion is thus kept at a maximum throughout the generator. The front wall 20 of the generator and the portions of the rear wall 6 located between the ends of the respective elements are preferably formed, as shown, of suitable steel I-beams which are adapted to keep the elements properly separated and to give the structure a suitable degree of stiffness. The I-beams are preferably lined on their inner surfaces by fire brick as indicated in the drawing. The water is supplied at or near the left end of the upper space of the upper element 7 by a suitable feed pipe 65 and the steam drum 58 is preferably connected with the upper element by means of a pipe 66, the point of communication of which with the element 7 is controlled by a float valve 67. A water gage 68 is connected to the two upper elements in such a way as to indicate when they are filled with water. A pet cock 68ª is provided to permit the escape of any air in the upper element 7. Pressure and temperature gages 69 and 70 are preferably connected with the steam drum.

The operation of the apparatus is as follows: The generator is filled with water up to a certain point in the upper element 7 and then the fire is started. The steam outlet being closed the steam generated in the lower element 11 will be distilled over into the upper element 7 and, the vent cock 68ª being open to permit the escape of air in the element 7, the water in the drum 58 will also be carried over. When the element 7 is filled with water the float valve 67 will close the pipe 66 and stop the distilling process. The steam pressure will then rise and the generator will then be ready to deliver steam. The water which is continuously supplied to the upper elements 7 and 8 will be gradually heated up to the temperature of vaporization corresponding to the pressure at which the apparatus is operated and as the water is delivered to the steam generating elements 9, 10 and 11 it will be broken up into spray and forced through the thin passages of these elements at a high velocity so as to absorb the latent heat of vaporization in a very efficient manner. When the fire is properly regulated in proportion to the demand for steam the water will all be transformed into steam before it passes the lower element 11 and the steam will be suitably superheated before it is delivered to the drum 58. The temperature gage or thermometer 70 is provided in order that the degree of superheat may be regulated. When the apparatus is stopped the fire must be banked so that an excessive pressure will not be generated as the water in the upper part of the apparatus flows by gravity down into the hot surfaces of the lower elements. As soon as the water begins to flow out of the upper part of the generator the float valve opens and permits the superheated steam to flow over into contact with the comparatively cool water in the element 7 where it is rapidly condensed. This operation prevents an excessive rise in the pressure. If the apparatus is left inactive so long as to permit the lower part of the apparatus to entirely fill with water, this water will, upon again starting up the fire, be distilled over into the upper element 7 and the apparatus may be started as before.

In accordance with the form of the generator illustrated in Fig. 7 the water heating and steam generating elements 71, 72, 73, 74 and 75 each have a single space or passage, said elements being formed by bending a single plate along a central line and then suitably securing the edges of the plate together. The two upper elements are preferably made much deeper than the others, so as to form reservoirs to maintain a considerable supply of water heated nearly to the point of vaporization. The elements are suitably separated from each other and they are alternately reversely arranged and staggered with relation to each other so as to form a sinuous passage for the escape of the products of combustion, as in the previous form of the device. As the elements contain only a single passage, however, they must be connected to each other alternately at or near the opposite ends of the generator so as to cause the water to flow through all parts of each of the elements. To this end the upper elements 71 and 72 are connected near their left ends with suitable flange joints similar to those shown in the previous form of the device. While only one of these joints is shown at 76, it will be understood that a pair of the connections would generally be used, one at each side. Similar connections 77, 78 and 79 are arranged between the elements 72, 73, 74 and 75, the connections between 72 and 73 and between 74 and 75 being located to the right and the connection between 73 and 74 being located to the left. For the purpose of taking the strain off from the parts, suitable distance pieces 80, 81, 82 and 83 are located between the otherwise unconnected ends of the elements, said distance pieces being arranged in line with the connections as shown. The water is supplied to the right hand end of the upper element 71 by a feed pipe 84 and the steam is delivered from the left hand end of the lowest element 75 to a drum 85 as in the previous form of the device. The steam drum is also connected with the upper element 71 by a pipe 76, the passage through which is controlled by a float 87 and a valve 88. A water gage glass 89 is preferably so connected to the upper elements 71 and 72 that it can be seen whether or not those elements are filled with water. The operation of this form of the device is precisely the same as that of the previous form.

It will be seen that in both forms of the generator each of the elements is free to expand independently of the others; also that there are no great differences of temperature between adjacent parts of the apparatus. The apparatus is gradually raised in temperature from the point where the water enters to the point where the steam is delivered and when the apparatus is in operation the temperature of each part thereof is kept substantially uniform. There are no sudden fluctuations in the temperature of any part of the apparatus. The heat of the products of combustion is gradually and uniformly and so perfectly absorbed that the products of combustion may be delivered at a lower temperature than that at which the steam is delivered.

My invention in its broader aspects is not limited to the precise construction shown and described, nor to the particular construction by which it may be carried into effect, as many changes may be made in the construction without departing from the main principles of the invention and without sacrificing its chief advantages.

What I claim as new and desire to secure by Letters Patent is:—

1. In a steam generator, the combination with a combustion chamber, of a plurality of water heating elements located remote from the combustion chamber, a plurality of steam generating elements located between said water heating elements and said combustion chamber, each element consisting of parallel plates secured together at their edges and at intermediate points to form water heating and steam generating spaces, said elements being connected in series to form a continuous passage for the fluid to be heated and to form between them a sinuous passage for the products of combustion, means for feeding water to the element farthest from the combustion chamber, and a steam delivery passage communicating with the element nearest the combustion chamber, said water feeding means and steam delivery passage communicating with each other only through the water heating and steam generating elements, the steam generating spaces in the steam generating elements being so small as to prevent the water and the steam from flowing in opposite directions in said steam generating spaces while steam is being delivered from the generator.

2. In a steam generator, the combination with a combustion chamber, of a plurality of steam generating elements each consisting of parallel plates secured together at their edges and at numerous intermediate points to form a steam generating space having a great area of heating surface in proportion to its volume, said elements being separated and arranged with relation to each other to form a single sinuous passage for the products of combustion, means forming communicating passages between the steam generating spaces in the elements and connecting said elements together in series, means for supplying water to the element farthest from the combustion chamber, said means comprising a water heating element arranged to maintain a considerable supply of water at the temperature of vaporization corresponding to the pressure at which the apparatus is operated, and means for delivering steam from the element nearest the combustion chamber.

3. In a steam generator, the combination with a combustion chamber, of a plurality of steam generating elements each consisting of three parallel plates slightly separated from each other and secured together at their edges and at numerous intermediate points so as to form a double or return passage having a great area of heating surface in proportion to its volume, said elements being separated and arranged with relation to each other to form between them a single sinuous passage for the products of combustion, means forming communicating passages between the elements and connecting them together in series, means for supplying water to the element farthest from the combustion chamber, and means for delivering steam from the element nearest the combustion chamber.

4. In a steam generator, the combination with a combustion chamber, of a plurality of steam generating elements each consisting of three parallel plates slightly separated from each other and secured together at their edges and at numerous intermediate points so as to form a double or return passage having a great area of heating surface in proportion to its volume, said elements being separated and arranged with relation to each other to form between them a single sinuous passage for the products of combustion, means forming communicating passages between the elements and connecting them together in series, means for supplying water to the element farthest from the combustion chamber, said means comprising a water heating element arranged to maintain a considerable supply of water at the temperature of vaporization corresponding to the pressure at which the apparatus is operated, and means for delivering steam from the element nearest the combustion chamber.

5. In a steam generator the combination with a combustion chamber, of a plurality of steam generator elements each consisting of a plurality of parallel plates secured together at their edges and at numerous intermediate points, said elements being separated to form a passage for the products of combustion, and means forming communicating passages between said elements, the plates of part of said elements being widely separated to form water heating supply reservoirs and the plates of other of said elements being slightly separated to form steam generating surfaces having great areas of heating surface in proportion to their volume.

6. In a steam generator, the combination with a combustion chamber, of a plurality of generator elements each consisting of a plurality of parallel plates secured together at their edges and at numerous intermediate points, said elements being separated and staggered with relation to each other to form a sinuous passage between said elements, and means forming communicating passages between the elements and connecting them together in series, the plates of one or more of the elements farthest from the combustion chamber being widely separated to form water heating supply reservoirs and the plates of the elements nearest the combustion chamber being slightly separated to form steam generating spaces having great areas of heating surface in proportion to their volume, and means forming communicating passages between said elements.

7. In a steam generator, the combination with a combustion chamber, of a plurality of generator elements each consisting of a plurality of parallel plates secured together at their edges and at numerous intermediate points, said elements being separated and staggered with relation to each other to form a sinuous passage between said elements, and means forming communicating passages between the elements and connecting them together in series, the plates of one or more of the elements farthest from the combustion chamber being widely separated to form water heating supply reservoirs and the plates of the elements nearest the combustion chamber being slightly separated to form steam generating spaces having great areas of heating surface in proportion to their volume, a feed pipe for supplying water to the element farthest from the combustion chamber and a steam drum for receiving the steam from the element nearest the combustion chamber.

8. In a steam generator, the combination with a combustion chamber, of a plurality of generator elements arranged one above another above the combustion chamber, each consisting of a plurality of parallel plates secured together at their edges and at numerous intermediate points, said elements being separated to form a passage for the products of combustion, means forming communicating passages between said elements and connecting them together in series, the plates of one or more of the elements farthest from the combustion chamber being widely separated to form water heating supply reservoirs and the plates of the elements nearest the combustion chamber being slightly separated to form steam generating spaces having a great area of heating surface in proportion to their volume, and steam-delivering means connected to the last element of the series.

9. In a steam generator, the combination with a combustion chamber, of a plurality of generator elements, each consisting of a plurality of parallel plates secured together at their edges and at numerous intermediate points, said elements being separated from each other and staggered with relation to each other to form a single sinuous passage for the products of combustion, and means forming communicating passages between said elements and connecting them together in series, the plates of one or more of the elements farthest from the combustion chamber being widely separated to form water heating supply reservoirs, and the plates of the elements nearest the combustion chamber being slightly separated to form steam generating spaces having great area of heating surface in proportion to their volume, a feed pipe for supplying water to the elements farthest from the combustion chamber and the steam drum for receiving steam from the element nearest the combustion chamber.

10. In a steam generator, the combination with a combustion chamber, of a plurality of steam generating elements each consisting of three parallel plates separated from each other and secured together at their edges and at numerous intermediate points so as to form a double or return passage having a great area of heating surface in proportion to its volume, and means forming communicating passages between said elements, the plates of part of said elements being widely separated to form water heating supply reservoirs and the plates of other of said elements being slightly separated to form steam generating surfaces having great areas of heating surface in proportion to their volume.

11. In a steam generator, the combination with a combustion chamber, of a plurality of steam generator elements arranged one above another above the combustion chamber, each consisting of three plates secured together at their edges and at numerous intermediate points so as to form a double or return passage, said elements being separated and staggered with relation to each other to form a single sinuous passage for the products of combustion, and means forming communicating passages between the said elements and connecting them together in series, the plates of one or more of said elements farthest from the combustion chamber being widely separated to form water heating supply reservoirs and the plates of the elements nearest the combustion chamber being slightly separated to form steam generator spaces having great areas of heating surface in proportion to their volume, a feed pipe for supplying water to the supply reservoirs and a steam drum for receiving the steam from the steam generating spaces.

12. A steam generator including in combination, a plurality of water heating and steam generating elements connected in series to form a continuous passage for the fluid to be heated and to form between them a sinuous passage for the products of combustion, means for feeding water to the element farthest from the combustion chamber and a steam delivery passage communicating with the element nearest the combustion chamber, said water feeding means and steam delivery passages communicating with each other only through the water heating and steam generating elements, the water heating elements having greater capacity than the steam generating elements and the spaces in said steam generating elements being so small as to prevent water and steam from flowing in opposite directions in said spaces while steam is being delivered from the generator.

In testimony whereof, I have signed my name to this specification, in the presence of two subscribing witnesses.

ALBERT A. E. STERZING.

Witnesses:
J. H. FREEMAN,
EDWIN SEGER.